July 1, 1958
G. EANNARINO ET AL
2,841,749
SELENIUM RECTIFIER
Filed April 11, 1955
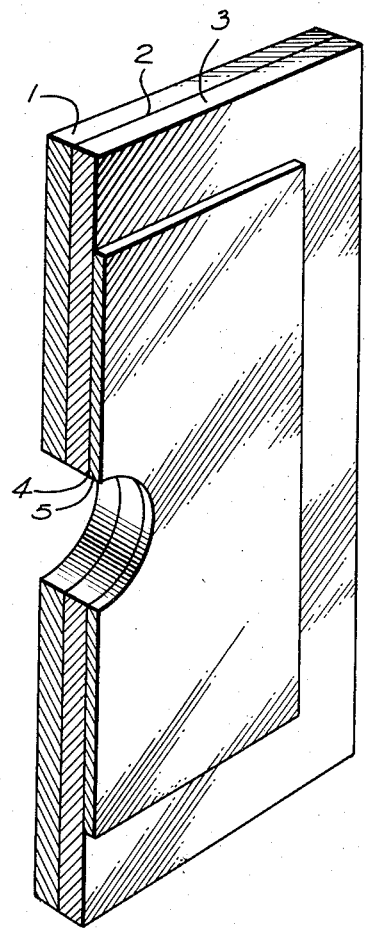
INVENTORS
GEORGE EANNARINO
AND ROBERT PARSONS
BY
ATTORNEYS 2,841,749

SELENIUM RECTIFIER

George Eannarino and Robert Parsons, Bloomington, Ind., assignors to Sarkes Tarzian, Inc., Bloomington, Ind., a corporation of Indiana Application April 11, 1955, Serial No. 500,407

19 Claims. (Cl. 317—241)

This invention relates to an improved selenium rectifier and to methods of preparing the same. More particularly, this invention relates to selenium rectifiers having a novel barrier layer between the selenium and the counter electrode. More specifically, the invention pertains to selenium rectifiers wherein the barrier layer between the selenium and the counter electrode is produced from certain organic amines and certain inorganic or organic acids.

It is generally believed that the effective rectifying action of dry rectifiers, such as selenium rectifiers, depends largely upon the formation of a barrier layer between the layer of selenium and the counter electrode, the latter commonly consisting of an alloy containing cadmium. This barrier layer is strengthened during the forming of the rectifier, which comprises applying direct or pulsating current to the rectifier in the reverse or poorly conducting direction. It has been found that the effective rectifying action of selenium rectifiers can be improved by interposing an artificial barrier layer between the selenium and the counter electrode. In the past, this artificial barrier layer has been made of shellac, nitrocellulose, nylon, or similar film-forming organic materials.

It is the object of the present invention to provide a selenium rectifier with a novel barrier layer having improved forward and reverse characteristics. It is a further object of this invention to provide a method for producing such barrier layers in selenium rectifiers. Another object of the invention is to produce such artifical barrier layers from the combination of certain inorganic or organic acids and certain basic organic nitrogen compounds. These and other objects of the invention will be apparent from the following disclosure.

The invention is more readily understood by reference to the following description taken in conjunction with the accompanying single-figure drawing which shows a cross-section of a rectifier cell. The base plate 1, which may be formed of aluminum or iron, is coated with a layer of nickel 2 by electroplating or other suitable deposition method. A layer of selenium 3 is deposited on the nickle-plated base plate under heat and pressure and suitably heat-treated to form metallic selenium. On the layer of selenium, a barrier layer 4 is developed in accordance with the present disclosure, and then on top of the barrier layer 4 a counter electrode 5 containing cadmium, commonly in the form of a cadmium alloy, is produced.

The formation of the barrier layer is accomplished by applying to the selenium layer a thin coating of a dilute solution of a combination of a organic amine having a boiling point above 100° C. and a basic dissociation constant in the range of $1 \times 10^{-3}$ to $1 \times 10^{-4}$ and an acid derived from an element in period 2 of group IVb, periods 2 and 3 of group Vb and periods 2, 3 and 4 of group VIb of the short form of the periodic table, namely, carbon, nitrogen, phosphorus, oxygen, sulfur and selenium, in a volatile solvent containing 10% or less of water. The solution may be applied by spraying, by rolling, by dipping, by painting, or by applying the solution near the center of the spinning rectifier plate. The organic solvent is allowed to evaporate at room temperature or at elevated temperature, leaving a residue of organic material probably partly in the nature of a salt between the organic amine and the acid. To the rectifier plate containing selenium coated in the above fashion, a counter electrode is applied in the conventional fashion on the selenium layer so treated. The counter electrode may be applied by spraying, as illustrated with a cadmium-bismuth alloy, or it may be applied by evaporation under high vacuum, as done with pure cadmium. Any of the conventional methods of applying the counter electrode are appropoirate to the present invention. The finished rectifier cell is then electroformed by passing a relatively high current through the rectifier cell in the reverse direction. The preferred method of forming the rectifier is that disclosed in the application of George Eannarino, Serial No. 475,705, filed December 16, 1954. The forming of the cell may be conducted at low temperature or at high temperature, or both, depending upon the properties desired in the rectifier.

The combinations of the organic amines and inorganic or organic acids described above, which are used in forming barrier layers in accordance with the present invention, are produced by forming a solution of the organic or inorganic acid in an aqueous solution of a volatile water-soluble organic solvent, and adding sufficient organic amine to adjust the pH to 6.0 to 7.5, and preferably in the range of 6.8 to 7.2. Higher alcohols such as furfuryl alcohol and benzyl alcohol can be added in small amounts to improve the stability of the barrier layer. Organic nitrogen compounds such as nitromethane, nitroethane, and other lower nitroparaffins may be added in small amounts, although neither these materials nor the higher alcohols are necessary to the successful operation of the invention.

Among the organic amines which can be successfully employed in developing the barrier layers of this invention are polymethylenediamines such as trimethylenediamine, tetramethylenediamine, pentamethylenediamine, beta - methyltetramethylenediamine, hexamethylenediamine, octamethylenediamine, and related amines. Also operative in the invention are alkanolamines such as N,N,N'N'-tetrakis(2-hydroxypropyl)ethylenediamine, triethanolamine, triisopropanolamine, and related amines.

The acids which can be used in producing barrier layers according to this invention are those derived from carbon, nitrogen, phosphorus, oxygen, sulfur and selenium and include sulfuric, phospshoric, selenic, selenous, sulfamic; benzenesulfoonic, toluenesulfonic, ethansulfonic, propanesulfonic, and similar organic sulfonic acids; carboxylic acids such as citric acid, tartaric acid, phthalic acid, methylenedisalicylic acid and acrylic acid, as well as certain strongly acidic phenols such as picric acid.

Solvents for these amine-acid combinations include aqueous solutions of water soluble volatile organic solvents such as lower alcohols including methanol, ethanol, n-propanol, isopropanol, and the like. Mixtures of such lower alcohols may also be used. Certain other organic solvents such as acetone, methyl ethyl ketone, or dioxane may be employed in small quantities to assist the solution. The solution generally contains small amounts of water in the order of 1% to 10% by volume, in order to aid in the interaction of the chemicals of the barrier layer with each other and with the selenium and counter electrode layers. The amount of nonvolatile materials is 0.01% to 10% by weight of the solution, and preferably in the range of 0.1% to 1%, the remainder of the solution being volatile organic solvents and water.

The counter electrode which forms a part of the rectifier may be composed of any of the metals used in selenium rectifier counter electrodes. In practice cadmium or cadmium alloys are preferred. The counter electrode may be applied by evaporation under high vacuum, by spraying or by any other suitable method. Among the alloys which may be employed as counter electrodes are cadmium-bismuth, cadmium-tin, cadmium-bismuth-lead and similar alloys melting between 90° and 300° C.

Rectifiers formed in accordance with the present invention have particularly advantageous properties. They have longer life in laboratory tests and in commercial operation than do corresponding selenium rectifiers formed by prior art methods. For example, rectifiers produced with selenic acid and hexamethylenediamine have exhibited operating lives of five to ten times as long as those of corresponding rectifiers wherein the barrier layer is produced from nylon according to the disclosure of Patent No. 2,660,698. In addition to increased life, rectifers are particularly stable against high humidity, high temperatures and high voltages.

The following formulations are representative of solutions within the scope of this invention which produce desirable selenium rectifiers.

Example 1

10 volumes of aqueous selenic acid (specific gravity 1.4) are dissolved in 500 volumes of water. 10 volumes of benzyl alcohol are added and the resulting solution is diluted with 2000 volumes of methanol. Sufficient hexamethylenediamine is added until the pH of the solution is 6.5. The solution is then diluted with four times its volume of isopropanol and the final solution is applied to a selenium rectifier.

Selenium rectifiers are prepared as follows: aluminum base plates are plated with nickel and a thin amorphous selenium coating is pressed thereon. The selenium layer is converted to metallic selenium by heat treatment. It is then sprayed with a thin coating of the above solution of hexamethylenediamine-selenic acid. To the dry selenium layer a thin film of bismuth-cadmium alloy is applied by spraying. Rectifier cells so produced are electroformed at low temperature according to the method of the Eannarino application, Serial No. 475,705, filed December 16, 1954. The rectifiers made in this manner are uniform in performance and stable over periods of time in excess of 5000 hours.

Example 2

50 milliliters of concentrated nitric acid are dissolved in 500 milliliters of water. To the resulting solution are added 2 liters of methanol. Hexamethylenediamine is added until the pH of the solution is 7.0. The solution is then diluted with 4 volumes of isopropanol to give a solution which can be applied to selenium layers by spinning.

Example 3

10 milliliters of 50% phosphoric acid are dissolved in 20 milliliters of water and 80 milliliters of methanol, followed by 10 milliliters of furfuryl alcohol. Sufficient hexamethylenediamine is added until the pH of the solution is 6.9. The resulting solution is diluted to five times its volume with isopropanol and applied to selenium rectifiers by spraying.

Example 4

50 milliliters of 95% sulfuric acid are dissolved in 500 milliliters of water. The solution is cooled and diluted with 2 liters of methanol. Hexamethylenediamine is added until the pH of the solution is 7.0. The resulting solution is diluted to eight times its volume with isopropyl alcohol and applied to selenium layers.

Example 5

5 grams of citric acid are dissolved in 10 milliliters of water. To this solution are added 50 ml. of ethyl alcohol containing 1 ml. of benzyl alcohol and 1 ml. of furfuryl alcohol. Sufficient N,N,N',N'-tetrakis(2-hydroxypropyl)ethylenediamine in the form of a 10% solution in ethanol is added until the pH of the solution is 6.8. The resulting solution is diluted with equal volume of isopropanol and applied to selenium rectifiers.

Example 6

5 grams of picric acid are dissolved in 100 milliliters of 95% ethanol. 1 ml. of furfuryl alcohol is added and the solution is then brought to pH of 6.5 with triethanolamine. The solution thus obtained is diluted with 5 volumes of isopropanol and applied to selenium rectifiers by roller coating.

Selenium layers treated as above are then coated with cadmium or cadmium alloys to a thickness of 0.001 inch to 0.01 inch. These cells are then electroformed by applying a current of relatively high current density in the range of 1 to 7 amperes per square inch in the reverse direction, either in oil solution or in air. Rectifiers produced in accordance with this invention exhibit a relatively long life and high stability, particularly against high temperatures and humidity.

While the invention has been described in connection with specific materials and conditions, it is to be understood that this description is provided by way of illustration only, and is not a limitation of the scope of the invention.

What is claimed as new and desired to be secured by Letters Patent of the United States is:

1. A unilateral conductor comprising a base plate, a layer of selenium on said base plate, a barrier layer on said selenium layer formed by coating the selenium layer with a dilute solution having a pH of 6.0 to 7.5 containing in a mixture of a volatile organic solvent and water a combination of an organic amine having a boiling point above 100° C. and a basic dissociation constant in the range of $1 \times 10^{-3}$ to $1 \times 10^{-4}$ and an acid of an element in that triangular section of the short form of the periodic table including period 2 of group IVb, period 2 of group VIb and period 4 group VIb, and a counter electrode on said barrier layer.

2. A unilateral conductor comprising a base plate, a layer of selenium on said base plate, a barrier layer on said selenium layer formed by coating the selenium layer with a dilute solution having a pH of 6.0 to 7.5 containing in a mixture of a volatile organic solvent and water a combination of an organic amine having a boiling point above 100° C. and a basic dissociation constant in the range of $1 \times 10^{-3}$ to $1 \times 10^{-4}$ and an acid derived from an element selected from the group consisting of carbon, nitrogen, oxygen, phosphorus, sulfur and selenium, and a counter electrode on said barrier layer.

3. A unidirectional conductor comprising an aluminum base plate, a layer of selenium on said base plate, a barrier layer on said selenium layer formed by coating the selenium layer with a dilute solution having a pH of 6.0 to 7.5 containing in a mixture of a volatile organic solvent and water a combination of an organic amine having a boiling point above 100° C. and a basic dissociation constant in the range of $1 \times 10^{-3}$ to $1 \times 10^{-4}$ and an acid of an element in that triangular section of the short form of the periodic table including period 2 of group IVb, period 2 of group VIb and period 4 of group VIb, and a counter electrode on said barrier layer.

4. A unidirectional conductor comprising an aluminum base plate, a layer of selenium on said base plate, a barrier layer on said selenium layer formed by coating the selenium layer with a dilute solution having a pH of 6.0 to 7.5 containing in a mixture a volatile organic solvent and water a combination of a polymethylenediamine and an acid of an element in that triangular section of the short form of the periodic table including period 2 of group IVb, period 2 of group VIb and period 4 of group VIb, and a counter electrode on said barrier layer.

5. A unidirectional conductor comprising an aluminum base plate, a layer of selenium on said base plate, a barrier layer on said selenium layer formed by coating the selenium layer with a dilute solution having a pH of 6.0 to 7.5 containing in a mixture of a volatile organic solvent and water a combination of a polymethylenediamine and an acid of an element in that triangular section of the short form of the periodic table including period 2 of group IVb, period 2 of group VIb and period 4 of group VIb, and a counter electrode containing cadmium on said barrier layer.

6. A unidirectional conductor comprising an aluminum base plate, a layer of selenium on said base plate, a barrier layer on said selenium layer formed by coating the selenium layer with a dilute solution having a pH of 6.0 to 7.5 containing in a mixture of a volatile organic solvent and water a combination of a polymethylenediamine and an acid of an element of periods 3 and 4 of group VIb of the short form of the periodic table, and a counter electrode containing cadmium on said barrier layer.

7. A unidirectional conductor comprising an aluminum base plate, a layer of selenium on said base plate, a barrier layer on said selenium layer formed by coating the selenium layer with a dilute solution having a pH of 6.0 to 7.5 containing in a mixture of a volatile organic solvent and water a combination of hexamethylenediamine and an acid of an element of periods 3 and 4 of group VIb of the short form of the periodic table, and a counter electrode containing cadmium on said barrier layer.

8. A rectifier comprising an aluminum base plate, a layer of selenium on said base plate, a barrier layer on said selenium layer formed by coating the selenium layer with a dilute solution having a pH of 6.8 to 7.2 containing in a mixture of a volatile organic solvent and water a combination of hexamethylenediamine and a sulfur acid, and a counter electrode containing cadmium on said barrier layer.

9. A rectifier comprising an aluminum base plate, a layer of selenium on said base plate, a barrier layer on said selenium layer formed by coating the selenium layer with a dilute solution having a pH of 6.8 to 7.2 containing in a mixture of a volatile organic solvent and water a combination of hexamethylenediamine and a carboxylic acid, and a counter electrode containing cadmium on said barrier layer.

10. A rectifier comprising an aluminum base plate, a layer of selenium on said base plate, a barrier layer on said selenium layer formed by coating the selenium layer with a dilute solution having a pH of 6.8 to 7.2 containing in a mixture of a volatile organic solvent and water a combination of hexamethylenediamine and a selenium acid, and a counter electrode containing cadmium on said barrier layer.

11. A rectifier comprising an aluminum base plate, a layer of selenium on said base plate, a barrier layer on said selenium layer formed by coating the selenium layer with a dilute solution having a pH of 6.8 to 7.2 containing in a mixture of a volatile organic solvent and water a combination of hexamethylenediamine and a phosphorus acid, and a counter electrode containing cadmium on said barrier layer.

12. A rectifier comprising an aluminum base plate, a layer of selenium on said base plate, a barrier layer on said selenium layer formed by coating the selenium layer with a dilute solution having a pH of 6.8 to 7.2 containing in a mixture of a volatile organic solvent and water a combination of hexamethylenediamine and a nitrogen acid, and a counter electrode containing cadmium on said barrier layer.

13. In a method of producing a unidirectional conductor comprising a base plate, a layer of selenium on said base plate, a barrier layer on said selenium layer, and a counter electrode on said barrier layer, the step of coating the selenium layer on the base plate with a dilute solution containing a combination of an organic amine having a boiling point above 100° C. and a basic dissociation constant in the range of $1 \times 10^{-3}$ to $1 \times 10^{-4}$ and an acid of an element in that triangular section of the short form of the periodic table including period 2 of group IVb, period 2 of group VIb and period 4 of group VIb, in a mixture of a volatile organic solvent and water having a pH in the range of 6.0 to 7.5.

14. In a method of producing a unidirectional conductor comprising a base plate, a layer of selenium on said base plate, a barrier layer on said selenium layer, and a counter electrode on said barrier layer, the step of coating the selenium layer on the base plate with a dilute solution containing a combination of an organic amine having a boiling point above 100° C. and a basic dissociation constant in the range of $1 \times 10^{-3}$ to $1 \times 10^{-4}$ and an acid of an element selected from the group consisting of carbon, nitrogen, oxygen, phosphorus, sulfur and selenium in a mixture of a volatile organic slovent and water having a pH in the range of 6.0 to 7.5.

15. In a method of producing a rectifier comprising a base plate, a layer of selenium on said base plate, a barrier layer on said selenium layer, and a counter electrode on said barrier layer, the step of applying to the selenium layer a dilute solution containing a combination of a polymethylenediamine and a sulfur acid in a mixture of a volatile organic solvent and water having a pH in the range of 6.0 to 7.5.

16. In a method of producing a rectifier comprising a base plate, a layer of selenium on said base plate, a barrier layer on said selenium layer, and a counter electrode on said barrier layer, the step of applying to the selenium layer a dilute solution containing a combination of a polymethylenediamine and a carboxylic acid in a mixture of a volatile organic solvent and water having a pH in the range of 6.0 to 7.5.

17. In a method of producing a rectifier comprising a base plate, a layer of selenium on said base plate, a barrier layer on said selenium layer, and a counter electrode on said barrier layer, the step of applying to the selenium layer a dilute solution containing a combination of a polymethylenediamine and a selenium acid in a mixture of a volatile organic solvent and water having a pH in the range of 6.0 to 7.5.

18. In a method of producing a rectifier comprising a base plate, a layer of selenium on said base plate, a barrier layer on said selenium layer, and a counter electrode on said barrier layer, the step of applying to the selenium layer a dilute solution containing a combination of a polymethylenediamine and a phosphorus acid in a mixture of a volatile organic solvent and water having a pH in the range of 6.0 to 7.5.

19. In a method of producing a rectifier comprising a base plate, a layer of selenium on said bas eplate, a barrier layer on said selenium layer, and a counter electrode on said barrier layer, the step of applying to the selenium layer a dilute solution containing a combination of a polymethylenediamine and a nitrogen acid in a mixture of a volatile organic solvent and water having a pH in the range of 6.0 to 7.5.

References Cited in the file of this patent

UNITED STATES PATENTS

| | | |
|---|---|---|
| 2,193,598 | Lotz | Mar. 12, 1940 |
| 2,266,922 | Thompson et al. | Dec. 23, 1941 |
| 2,507,782 | Goodman | May 16, 1950 |
| 2,510,361 | Addink | June 6, 1950 |
| 2,660,698 | Black | Nov. 21, 1950 |
| 2,794,943 | Eannarino et al. | June 4, 1957 |